R. L. BOYERS.
NUT LOCK.
APPLICATION FILED MAR. 17, 1914.

1,179,273. Patented Apr. 11, 1916.

UNITED STATES PATENT OFFICE.

ROBERT L. BOYERS, OF ARDMORE, OKLAHOMA.

NUT-LOCK.

1,179,273.  Specification of Letters Patent.  Patented Apr. 11, 1916.

Application filed March 17, 1914. Serial No. 825,273.

*To all whom it may concern:*

Be it known that I, ROBERT L. BOYERS, a citizen of the United States, residing at Ardmore, in the county of Carter and State of Oklahoma, have invented certain new and useful Improvements in Nut-Locks, of which the following is a specification.

This invention relates to new and useful improvements in nut locks, and more particularly to that class adapted to be used in connection with rail-joints and the like, it being understood however that I am not to be limited to such use alone, but may use the novel structure in connection with any article to which the various parts thereof will adapt themselves.

The main object of this invention is the provision of a novel plate which can be applied to the ties adjacent a rail-joint, and when so disposed, will engage the nuts of the rail-joint in such manner as to prevent their displacement.

A further object of this invention is the provision of a device of the character above specified, which will be comparatively simple and inexpensive to manufacture, reliable and efficient in use, and readily operated.

With the above and other objects in view, this invention resides in the novel features of construction, formations, combinations and arrangements of parts, to be hereinafter more fully described, claimed and illustrated in the accompanying drawings in which—

Figure 1:
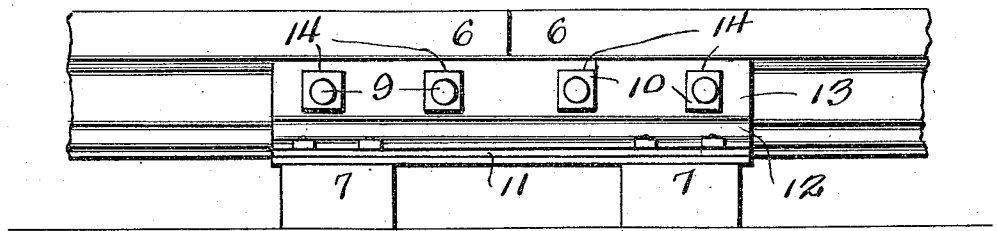
Figure 2:
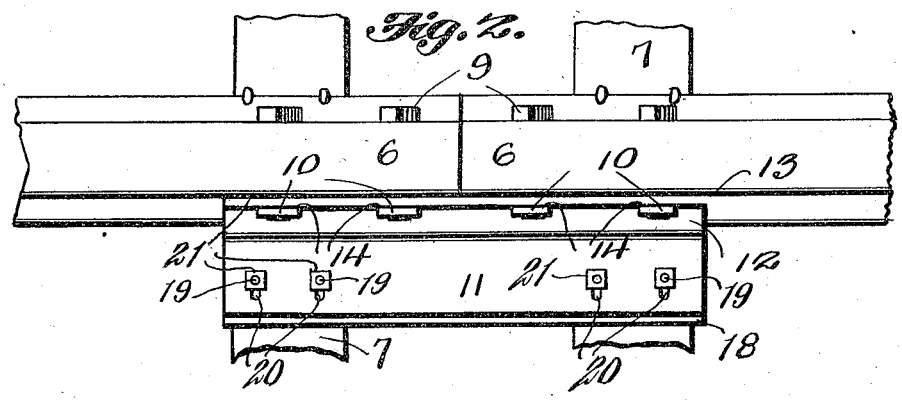
Figure 3:
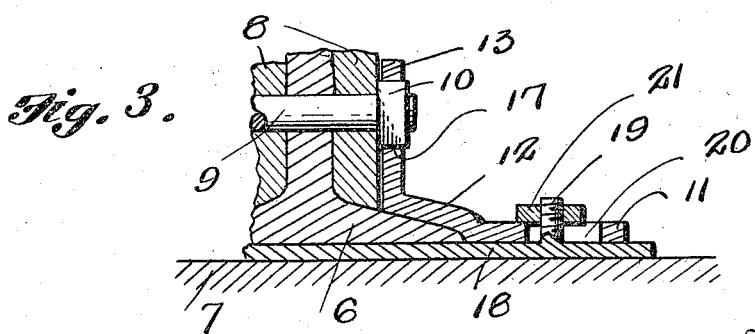

Figure 1 is a side elevation of my invention; Fig. 2 is a top plan view thereof; Fig. 3 is a similar view showing a still further modification of my invention.

Referring to the accompanying drawings by similar characters of reference throughout the several views, the numeral 6 designates the meeting ends of a pair of rails, mounted upon the ties 7, and engaged by the customary fish plates 8. Bolts 9 pass through openings provided in the rails and fish plates 6 and 8, and are retained in position by the nuts 10. A plate 11 is secured in any manner to the ties 7, and is curved upwardly as at 12, toward the rails 6, terminating in the vertical flange 13, notched in its upper edge as at 14, to receive the nuts 10 and prevent their rotation, consequently locking them upon the bolts 9.

Referring to Fig. 3 of the drawings, the sockets and likewise the notches previously mentioned are dispensed with and angular openings substituted. These openings indicated by the numeral 17 are of a size to receive the bolts and nuts 10. A plate 18 is secured to the ties 7 below the rails 6, and is formed with upstanding pins 19, which pass through the elongated slots 20, provided in the plate 11. Nuts 21, are threaded on the pins 19 to prevent any undesired movement of the plate 11 which would serve to disengage the openings 17 from the nuts 10.

The device is used as follows: The structure disclosed in Figs. 1, 2 and 3, can be made from either stiff or pliable material and when the former is the case, the nuts 10 are turned to the position shown in Fig. 1 and the plate is positioned so the nuts 10 will be in notches 14. The plate is then spiked to the ties. When the plate 11 is made from pliable material the same is spiked to the ties and then bent to engage the nuts 10, after the latter have been properly positioned.

In applying the device disclosed in Fig. 3, the plate 18 is first secured to the ties 7 and then the rails 6 positioned and secured against displacement. The plates 11 are next applied and moved toward the rails 6, until the nuts 10 are positioned within the openings 17. The nuts 21 are then applied which holds the various parts against displacement.

It should be understood in this connection that various minor changes in the specific details of construction can be resorted to within the scope of the appended claim, without departing from or sacrificing any of the advantages of the invention.

From the foregoing disclosures taken in connection with the accompanying drawings it will be manifest that a nut lock is provided, which will fulfil all the necessary requirements of such a device.

Having thus fully described this invention, what I claim as new, and desire to protect by Letters Patent is:

In a rail joint, the combination with the meeting ends of a pair of rails and ties supporting said rails, fish plates engaging opposite sides of said rails, bolts passing through the rails and fish plates, nuts threaded upon said bolts, a base plate interposed between the rails and ties and projecting beyond the sides of the rails adjacent said bolts, upwardly extending integral pins formed upon the base plate in spaced relation to the edges of the rails, a plate slidable upon the base plate to and from said rails, said plate having slots therein through which the integral pins are extended, a flange formed upon the inner edge of the plate for movement to and from the adjacent fish plate, said flange having recesses therein for receiving the nuts threaded upon the pins for contact with the plate and holding the flanges in locking position relative to the nuts.

In testimony whereof I affix my signature in presence of two witnesses.

ROBERT L. BOYERS.

Witnesses:
F. L. COFFLAND,
J. R. DEXTER.

Copies of this patent may be obtained for five cents each, by addressing the "Commissioner of Patents, Washington, D. C."